(12) United States Patent
Hochwarth et al.

(10) Patent No.: US 11,868,233 B2
(45) Date of Patent: *Jan. 9, 2024

(54) SYSTEMS AND METHOD FOR FLEXIBLE WRITE- AND READ-ACCESS OF A REGULATED SYSTEM

(71) Applicant: GE Aviation Systems LLC, Grand Rapids, MI (US)

(72) Inventors: Joachim Karl Ulf Hochwarth, Caledonia, MI (US); Terrell Michael Brace, Ada, MI (US); Víctor Mario Leal Herrera, Querétaro (MX); Antonio Lugo Trejo, Querétaro (MX)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/983,624

(22) Filed: Nov. 9, 2022

(65) Prior Publication Data
US 2023/0071846 A1   Mar. 9, 2023

Related U.S. Application Data

(63) Continuation of application No. 17/010,114, filed on Sep. 2, 2020, now Pat. No. 11,513,941.

(51) Int. Cl.
| | |
|---|---|
| *G06F 11/36* | (2006.01) |
| *G06F 12/14* | (2006.01) |
| *G06F 21/62* | (2013.01) |
| *G09B 9/08* | (2006.01) |
| *G06F 8/65* | (2018.01) |

(52) U.S. Cl.
CPC .......... *G06F 11/3612* (2013.01); *G06F 12/14* (2013.01); *G06F 12/1458* (2013.01); *G06F 21/62* (2013.01); *G09B 9/08* (2013.01); *G06F 8/65* (2013.01); *G06F 2212/1052* (2013.01)

(58) Field of Classification Search
CPC .. G06F 11/3612; G06F 12/14; G06F 12/1458; G06F 21/62; G06F 8/65; G06F 2212/1052; G06F 11/3664; G06F 21/6218; G06F 11/3696; G06F 21/604; G06F 9/44505; G09B 9/08
USPC ................................................. 717/127, 124
See application file for complete search history.

(56) References Cited

U.S. PATENT DOCUMENTS

| | | |
|---|---|---|
| 6,923,375 B2 | 8/2005 | Stefani |
| 7,769,501 B2 | 8/2010 | Lusardi et al. |
| 7,840,770 B2 | 11/2010 | Larson et al. |
| 8,255,112 B2 | 8/2012 | Conzachi et al. |

(Continued)

FOREIGN PATENT DOCUMENTS

| | | |
|---|---|---|
| CN | 1685297 A | 10/2005 |
| CN | 103959247 A | 7/2014 |

(Continued)

*Primary Examiner* — David Yi
*Assistant Examiner* — Zubair Ahmed
(74) *Attorney, Agent, or Firm* — McGarry Bair PC

(57) ABSTRACT

A system for read-access of a regulated system, the system comprising a specialized data store, at least one memory, and a flexible reader. The specialized data store able to receive at least a portion of a set of procedures that define a respective set of systematic data and executable operations. The at least one memory including at least one set of data related to the set of procedures.

20 Claims, 5 Drawing Sheets

(56) References Cited

U.S. PATENT DOCUMENTS

| | | | |
|---|---|---|---|
| 9,714,081 B1 | 7/2017 | Hall, III et al. | |
| 10,116,749 B2 | 10/2018 | Gunn et al. | |
| 10,417,261 B2 | 9/2019 | Hochwarth et al. | |
| 2011/0102140 A1 | 5/2011 | McGeachie | |
| 2013/0166271 A1* | 6/2013 | Danielsson | G06F 30/20 |
| | | | 703/22 |
| 2016/0373184 A1 | 12/2016 | Oder et al. | |
| 2017/0242910 A1* | 8/2017 | Hochwarth | H04B 7/18506 |
| 2018/0146003 A1* | 5/2018 | Amor | G06F 11/1479 |
| 2018/0163095 A1 | 6/2018 | Khoche | |
| 2020/0097196 A1 | 3/2020 | Hochwarth et al. | |

FOREIGN PATENT DOCUMENTS

| | | |
|---|---|---|
| CN | 105303113 A | 2/2016 |
| CN | 106462616 A | 2/2017 |
| CN | 107992444 A | 5/2018 |
| CN | 109923548 A | 6/2019 |

* cited by examiner

SYSTEMS AND METHOD FOR FLEXIBLE WRITE- AND READ-ACCESS OF A REGULATED SYSTEM

CROSS-REFERENCE TO RELATED APPLICATIONS

This application is a continuation of U.S. patent application Ser. No. 17/010,114, filed Sep. 2, 2020, now U.S. Pat. No. 11,513,941, issue Nov. 29, 2022, which is hereby incorporated herein by reference in their entirety.

TECHNICAL FIELD

The disclosure relates to a method and apparatus for flexible write- and read-access of a regulated system.

BACKGROUND OF THE DISCLOSURE

Modern aircraft employ complex Flight Management Systems (FMSs) that handle and control large amounts of important data for the aircraft, along with operating at least a portion of the aircraft. Presently, in order to access (e.g. read or write) internal data of the FMS, an access interface that is defined at compile time in the software is required. Due to certification requirements and safety concerns, changing or altering this access interface necessitates additional testing and recertification. As a result of the additional testing and recertification requirements, the access interface can be difficult and costly to change. Often these access interfaces will have undergone many changes throughout the course of a development program but are too costly to change once the system is in service.

BRIEF DESCRIPTION OF THE DRAWINGS

A full and enabling disclosure of the present description, including the best mode thereof, directed to one of ordinary skill in the art, is set forth in the specification, which makes reference to the appended FIGS., in which.

DETAILED DESCRIPTION

Figure 1:
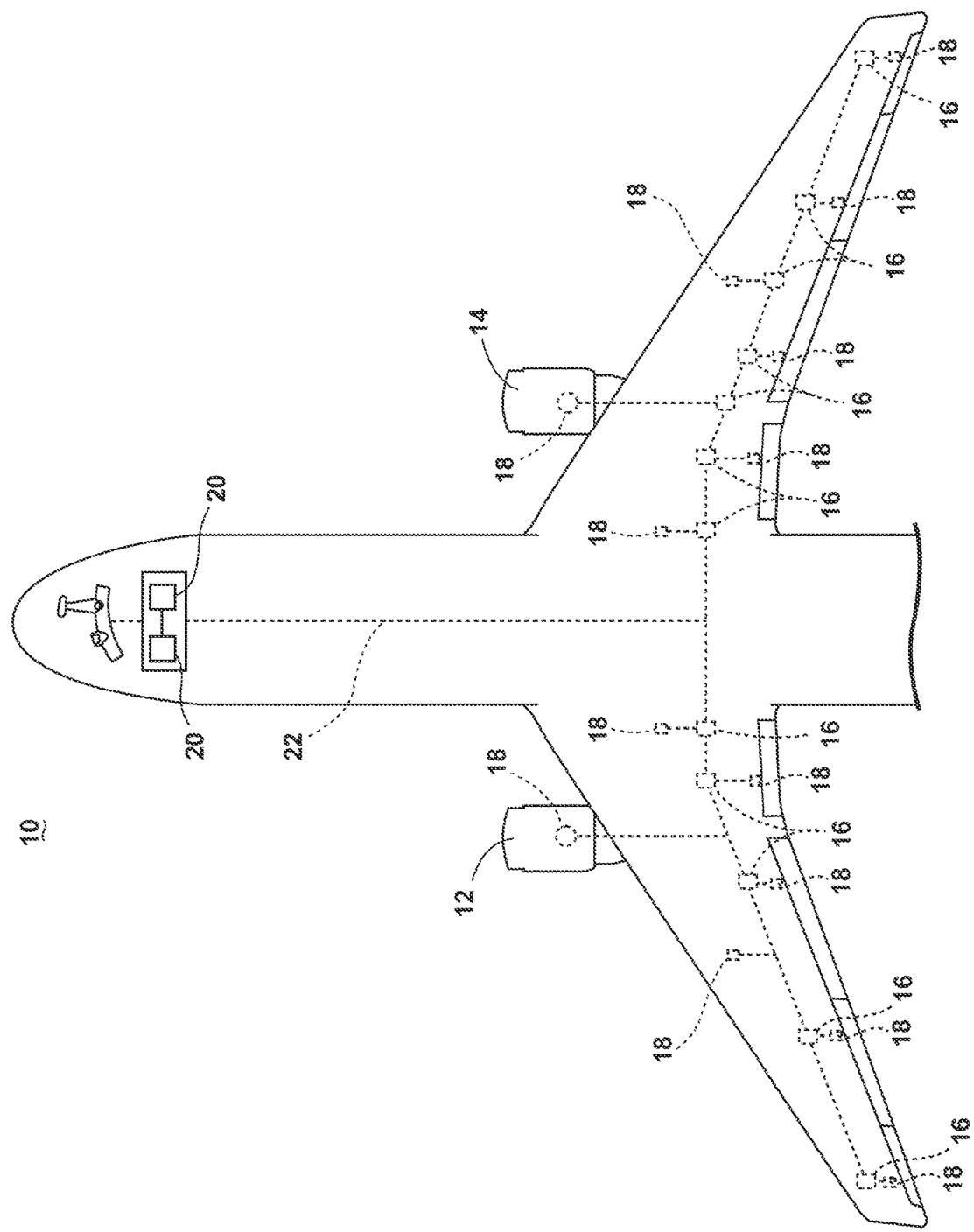
FIG. 1 illustrates a top-down schematic view of an aircraft, accordance with various aspects described herein.

Aspects of the disclosure can be implemented in any test environment, simulation, or operation of an aircraft. Specifically, the apparatus or system described herein can include a system and method to allow for runtime write-access and runtime read-access of a regulated system. The method and system as described herein can allow for a user to input or define a set of procedures. As used herein, the term "procedure" can refer to a series of events or operations that is set according to an external component of the regulated system. It will be appreciated that that the set of procedures can include any number of one or more procedures. Alternatively, it will be appreciated that the set of procedures can be defined as a single data value. The set of procedures can each define a set of systematic data and an executable operation which can be executed through the regulated system. As used herein, the term "systematic data" can refer to any set of data included within the set of procedures that is set according to an external component of the regulated system. Non-limiting examples of the systematic data can include, but are not limited to, a pressure, an altitude, a speed, a velocity, an acceleration, a temperature, or the like. As further used herein, the term "executable operation" can be defined as a procedure as defined by the set of procedures, which can be executed through the regulated system. The executable operation can include, but is not limited to, a simulated or actual approach, flight, ascent, descent, or any combination thereof. It will be appreciated that although described in terms of a singular executable operation that the executable operation can be included within a set of executable operations. The regulated system can include a flexible writer that can be configured to intercept a runtime instruction communication sent to an authorized writer communicatively connected to a specialized data store of a regulated system in order to input or define the set of procedures. The specialized data store can subsequently solicit the real-time execution of the executable operation of the regulated system. A flexible reader can be provided within the regulated system and be configured to receive instructions from the specialized data store on what data to retrieve from one or more memory which is relevant to the executable operation of the regulated system. As used herein, the term "memory" can refer to at least one data element either within or accessible through the regulated system and configured to store at least one set of data or a subset of data either temporarily or permanently. It will be appreciated that there can be any number of memory within the regulated system and that a collective set of memory can referred to as "memory" or "memories". A receiving component exterior to the regulated system can be configured to receive the retrieved data through a real-time execution output from a portion of the regulated system (e.g., the flexible reader). The system described herein can allow for the set of procedures to be dynamically updated or input during runtime of the regulated system.

To ensure dynamic or continuous updates to the system, the flexible data writer can be implemented to intercept runtime instruction communications from the authorized data writer before it reaches its destination (e.g., the specialized data store). A specialized data store can be configured to receive these runtime instruction communications and solicit the retrieval and real-time execution output for data relating to the runtime instruction communications through the flexible reader and to the receiving component. Further, the system can include an auxiliary system configured to provide updated or dynamic runtime instructions from at least a portion of the auxiliary system that can define the set of procedures input into the regulated system either at startup or during runtime of the regulated system. Specifically, the auxiliary system can be a test system configured such that the flexible data writer can receive updated or dynamic runtime instructions from a user that can define the set of procedures input to the regulated system during runtime of the regulated system. As such, the regulated system can be operated according to the set of procedures and the receiving component can receive the real-time execution output from the regulated system. Aspects of this disclosure relate to the regulated system being operably coupled to a test system. As such, non-limiting examples of the set of procedures defining the set of systematic data and the executable operation can be defined as a set of test procedures defining a set of test data and an executable test operation. As such, the regulated system can receive the set of test procedures defining the set of test data that can ultimately be injected into a portion of the regulated system such that that the regulated system is operated according to the excitable test operation.

Further, although aspects of the present disclosure are discussed in regards to the test system, the subject matter described herein can also be used with or applied to regulated system used in vehicle during real-time operation of the vehicle. It will be appreciated that reference to the set of procedures, the set of systematic data, and the executable operations refers to procedures, data, or operations, respectively, used through or executed by the regulated system either during real-time operation of the vehicle (e.g., the executable operation is defined as an executable flight operation in terms of an aircraft), or within a testing scenario (e.g., the executable operation is defined as the executable test operation).

Aspects of the disclosure can be implemented in any environment, apparatus, system, or method having a regulated, restricted, authorized, or otherwise limited write-access privileges to a memory or data store component. As used herein, "write-access" means availability or authorization to commit a change to a memory location, the change being storing or overwriting data, values, commands, instructions, or any other data, element, or identifier to a memory location, regardless of the function performed by the data, element, or identifier, or regardless of the function or implementation of the environment, apparatus, system, or method. It will be yet further appreciated that the write-access privileges can also include committing to memory pieces of overwritten data (e.g., a portion of memory that is updated or otherwise overwritten). As such, the pieces of overwritten data can be committed to memory such that prior overwritten data can be accessed again after they had been overridden. This can allow for a de-override of at least the overwritten data such that the environment, apparatus or system that includes the overwritten data can operate according to the pieces of overwritten data. Further aspects of this disclosure can be implemented in any environment, apparatus, system, or method having a regulated, restricted, authorized, or otherwise limited read-access privileges to a memory or data store component. As used herein, "read-access" means availability or authorization to read one or more sets of data within a corresponding memory, the sets of data can be, for example, overwritten data, values, commands, instructions, or any other data, element, or identifier to a memory location. Collectively, "access" to data or "accessing" data can refer to either reading, viewing, or otherwise receiving data from a data store, writing data, as referenced above, or a combination thereof. As used herein, the term "regulated system" can refer to a system having restrictions on access, such as write-access to data or values of the system, whereby only approved or authorized entities, parties, functions, or the like, are enabled or otherwise allowed to access the regulated or restricted elements. In one non-limiting example, only a single authorized function can have write-access to a specific data element and only a single authorized function can have read-access to a specific data element. Non-limiting examples of the regulated system can include, but is not limited to, a regulated ARINC system, a regulated avionics system, a regulated Flight Management System (FMS), or systems that interact therewith. As used herein, a regulated system can further include a system designed for regulated access controls regardless of installation or certification status. For example, the regulated system can refer to a non-certified FMS used in a testing scenario. Although example aspects of the present disclosure are discussed with reference to regulated system being the avionics systems such as an FMS, the subject matter described herein can be used with or applied to provide flexible access to internal data of other systems, vehicles, machines, industrial or mechanical assets, or components without deviating from the scope of the present disclosure. Although example aspects of the present disclosure are discussed with reference to regulated system being the avionics systems such as an FMS, the subject matter described herein can be used with or applied to provide flexible access to internal data of other systems, vehicles, machines, industrial or mechanical assets, or components without deviating from the scope of the present disclosure. It will be further appreciated that there can be any number of one or more writers configured to have write-access to any one or more suitable memory of the regulated system. It will be yet further appreciated that there can be any number of one or more readers within or otherwise accessible through the regulated system having read-access to any one or more suitable memory of the regulated system.

While "a set of" various elements will be described, it will be understood that "a set" can include any number of the respective elements. It will be yet further understood that the "a set" can include only one element. Also, as used herein, while elements or components can be described as "sensing" or "measuring" a respective value, data, function, or the like, sensing or measuring can include determining a value indicative of or related to the respective value, data, function, or the like, rather than directly sensing or measuring the value, data, function, or the like, itself. The sensed or measured value, data, function, or the like, can further be provided to additional components. For instance, the value can be provided to a controller module or processor, and the controller module or processor can perform processing on the value to determine a representative value or an electrical characteristic representative of said value, data, function, or the like.

Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. Non-limiting example power distribution bus connections or disconnections can be enabled or operated by way of switching logic, or any other connectors configured to enable or disable the connection between respective elements or component.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, Digital Versatile Discs (DVDs), Compact Disc-Read Only Memory (CD-ROMs), etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

As used herein, a "data store" can include a set of data values stored in a memory, wherein the data value is only write-accessible by a single function, program, entity, or the like (a "writer"). The write-accessibility of the data store can be policed or otherwise regulated by digital security mechanisms understood by those skilled in the art. While only a single writer has write-access to the data store, a data store can have or include multiple function, program, or entities having read-access to read, view, or otherwise receive the data in a unidirectional relationship. In contrast with the data store, a "data store queue" can include a data value or set of data values stored in a memory, wherein the data value is write-accessible by a set of one or more functions, programs, entities, or the like. The write-accessibility of the data store queue can be policed or otherwise regulated by digital security mechanisms understood by those skilled in the art. Additionally, a data store queue can include only a single function, program, or entity having read-access to read, view, or otherwise receive the data in a unidirectional relationship. In non-limiting examples, this read operation can be one-time or destructive (e.g. removing the data after the access operation).

Reference will now be made in detail to aspects of the disclosure, one or more non-limiting examples of which are illustrated in the FIGS. Each example is provided by way of explanation of the disclosure, not limitation of the disclosure. In fact, it will be apparent to those skilled in the art that various modifications and variations can be made in the present disclosure without departing from the scope or spirit of the disclosure. Thus, it is intended that the present disclosure covers such modifications and variations as come within the scope of the appended claims and their equivalents.

Example aspects of the present disclosure are directed to systems and methods that enable flexible access to internal data of a regulated system. Non-limiting examples of the regulated system can include, but are not limited to, an avionics system, or other embedded devices suitable to enable flexible access to internal data of the regulated system. Non-limiting examples of the regulated systems can include, but are not limited to, a Flight Management System (FMS), an Airport Surface Map System (ASMS), or the like. In particular, an access interface that is defined at compile time in the software is typically required to access internal data from the FMS. However, changing or altering the access interface necessitates system source code modification, re-compilation, which requires re-certification, which ultimately requires re-verification. As such, changing or alternating the access interface ultimately results in an increase in cost, and an increase in testing burden, which yet further increases the cost. Creating multiple versions of a compiled program can be very expensive and difficult to maintain. As a result of such additional testing and recertification requirements, the access interface can be difficult and costly to change.

Aspects of the present disclosure provide a technique to select, customize, or otherwise flexibly define data, specifically the set of procedures, that is input, received by, or executed through at least a portion of the regulated system during runtime. In particular, in some implementations, systems of the present disclosure can include a configuration tool that enables a system operator to make selections (e.g., via a user interface) of which data is thereafter input or received by or otherwise provided from the regulated system during runtime, for storing in, reading from, or writing to, memory.

Aspects of the present disclosure provide a technique to customize or otherwise define data, values, parameters, or the like, related systematic data and executable operations of the regulated system during runtime. Furthermore, aspects of the present disclosure enable enhanced, flexible, and robust reading and outputting data related to the systematic data and executable operations of the regulated system. In yet another instance, aspects of the disclosure can provide for or enable an open or accessible interface to third-party applications running on either the embedded system or outside of it to interact with the system (e.g. an embedded Advanced Interval Management (A-IM) application or an application running on an Electronic Flight Bag (EFB)).

The exemplary drawings are for purposes of illustration only and the dimensions, positions, order and relative sizes reflected in the drawings attached hereto can vary.

Referring now to FIG. 1, an example aircraft 10 is shown having a fuselage and at least one turbine engine, shown as a left engine system 12 and a right engine system 14. The left and right engine systems 12, 14 may be substantially identical. While the left and right engine systems 12, 14, specifically turbine engines, are illustrated, the aircraft 10 may include fewer or additional engine systems, or alternative propulsion engine systems, such as propeller-based engines.

The aircraft 10 is shown, further comprising a plurality of sensors, systems, and components, collectively referred to as Line-Replaceable Units (LRUs) 16, 18, and at least one server 20 or computing unit, shown as two FMSs, or flight control computers, located proximate to each other, near the nose of the aircraft 10. At least one of the servers 20 may further include memory.

The LRUs 16, 18 and servers 20 may be communicatively interconnected by transmission or communication lines defining a data communications network 22, traversing at least a portion of the aircraft 10. Additional LRUs 16, 18 can be included. While a server 20 is described, aspects of the disclosure can include any computing system, flight computer, or display system displaying data from multiple systems.

The memory of the servers 20 can include RAM, flash memory, or one or more different types of portable electronic memory, etc., or any suitable combination of these types of memory. The LRUs 16, 18 or servers 20 may be operably coupled with the memory such that the LRUs 16, 18 or servers 20, or any computer programs or processes thereon, may access at least a portion of the memory (e.g. "shared memory").

The aircraft 10 shown in FIG. 1 is merely a schematic representation of one non-limiting example environment of the disclosure and is used to illustrate that a plurality of LRUs 16, 18 and servers 20 may be located throughout the aircraft 10. The exact location of the LRUs 16, 18 and servers 20 are not germane to the aspects of the disclosure. Additionally, more or fewer LRUs 16, 18 or servers 20 may be included in aspects of the disclosure.

The communications network 22 is illustrated schematically as a bus but may include a number of data communication connectors and interfaces, for example, Ethernet or fiber optic cables, and routing or switching components, to facilitate the communicative interconnection between the LRUs 16, 18 and servers 20. Furthermore, the configuration and operation of the communications network 22 may be defined by a common set of standards or regulations applicable to particular aircraft environments. For example, the communications network 22 on an aircraft 10 may be defined by, or configured according to, the ARINC 664 (A664) standard, ARINC 429 (A429) standard, ARINC 825 (A825) standard, or the RS-422 standard.

Figure 2:
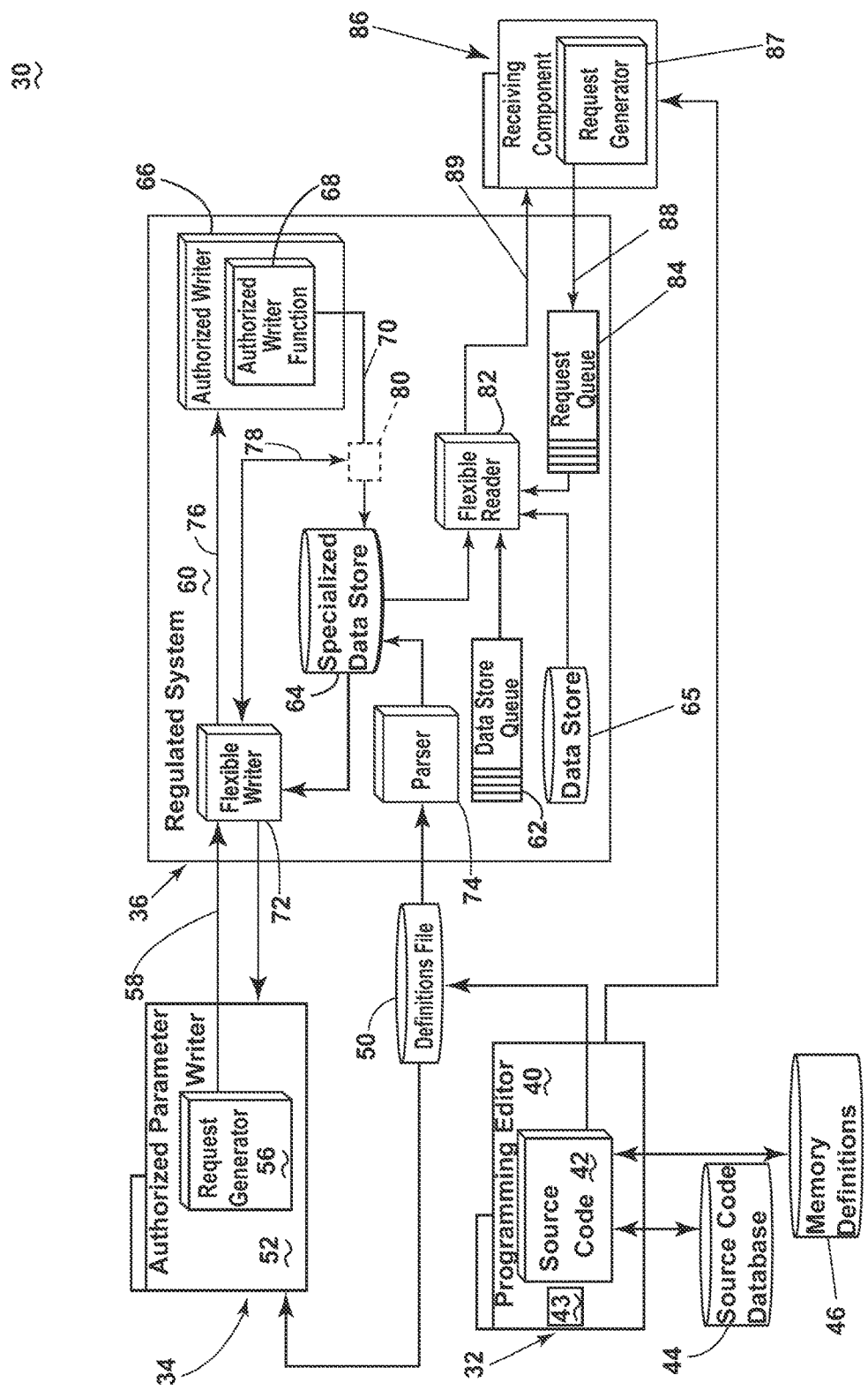
FIG. 2 illustrates an example schematic view of a system to provide flexible write- and read-access of a regulated system, in accordance with various aspects described herein.

FIG. 2 illustrates a system 30, specifically a system within the aircraft 10 of FIG. 1, for providing flexible write- and read-access to internal data of a regulated system 60 (e.g., an avionics system) As shown, the system 30 can include a set of environments that are schematically shown interacting with each other.

The system 30 can include a programming environment 32 having a programming editor 40 interface for coding, editing, or otherwise developing a system source code 42 for the regulated system 60, specifically an avionics system. Non-limiting examples of the programming environment 32 can include a first data storage (shown as the system source code database 44) for storing system source code elements, coding data, revision histories, or the like. The programming environment 32 can further include a second data storage for storing information related to the regulated system 60. Specifically, the second data storage can include a memory definition 46, which can include, at least, a set of information relating to the regulated system data variable definitions. This information can be referred to as the memory definition 46 information. As such, the programming environment 32 can access the set of regulated system data variable definitions located within the memory definitions 46 in order to obtain information related to the regulated system 60. It is contemplated that the programming environment 32 can access the system source code database 44 to get the system source code 42 and then extract the memory definition 46 information. The programming environment 32, specifically the programming editor 40, can then be utilized via a user to decide what parameters obtained from the memory definition 46 information the user wants to be identified or otherwise communicated to at least another portion of the system 30 and ultimately be communicated to the regulated system 60. In one non-limiting example, the memory definition 46 information can be developed by, or otherwise identified by a configuration tool function, hereafter, configuration tool 43. Although illustrated as the configuration tool 43 included within the programming editor 40, it is further contemplated that the configuration tool 43 can be defined as a tool exterior the programming editor 40 that runs independently of the programming editor 40 by parsing system source code and generating that data store definition information.

It will be further appreciated that the programming environment 32 can be defined as a toolchain to process the system source code 42. In other words, the programming environment 32 can include various components or tools, which can be executed according to a set execution sequence to process the system source code 42. The components of the programming environment 32 can include, but is not limited to, a compiler, a debugger, a set of data libraries, an assembler, a linker, or any combination thereof. Additionally, or alternatively, the programming environment 32 can include an Integrated Development Environment (IDE), which can include or otherwise be configured to access or call upon one or more tools of the toolchain configured to write the system source code 42. It will be yet further appreciated that the programming editor 40 can be included within the toolchain of the programming environment 32 such that the toolchain can develop and process the system source code 42. In other words, the purpose of the programming editor 40 can be fulfilled through one or more components included within the toolchain of the programming environment 32 such that the programming editor 40 interface does not need to be included in order to code, edit, or otherwise develop the system source code 42.

In response to the development of the system source code 42, the programming environment 32 can be configured to generate one or more loadable configuration files, shown as a definitions file 50. Although illustrated as a single definitions file 50, it will be appreciated that there can be a set of definitions files 50. As such, the system 30 can include a set of loadable configuration files. The loadable configuration file, or the definitions file 50, can be configured to provide one or more sets of data, executable commands, or runtime instructions to the regulated system 60. For example, the definitions file 50 can include, at least, the set of procedures that can ultimately be injected or otherwise input to at least a portion of the regulated system 60. The definitions file can further include at least a portion of the memory definition 46 information. This information can be at least partially conveyed to the regulated system 60 and act as an identification of one or more components within the regulated system 60. Specifically, the definitions file 50 can include at least a portion of the memory definition 46 information to define the set of memory within the regulated system 60.

The system 30 can also include an authorized parameter writer environment 34 that can include an authorized parameter writer 52 interface adapted or configured to receive an input (e.g., at least a portion of the definitions file 50) and generate a write request instruction from a request generator 56 for updating, writing, storing, or committing at least a portion of the definitions file 50 to storage in the regulated system 60.

The system 30 is further shown including one non-limiting example regulated system environment 36 including or defining a regulated system 60. In one non-limiting example, the regulated system 60 can be defined as an avionics system (e.g., an FMS). The regulated system 60 can include a data store queue 62, a specialized data store 64, a data store 65, a flexible writer 72, an authorized writer 66 including an authorized writer function 68, a parser 74, and a flexible reader 82. The data store queue 62, and the data store 65 can be configured to exchange data between at least two components of the regulated system. The data store 65 can be further configured to store data within the regulated system 60. Although illustrated as a singular data store 65 and a singular data store queue 62, it will be appreciated that the data store 65 and the data store queue 62 can each be included within a set of data stores 65 or a set of data store queues 62, respectively. It will be further appreciated that the set of data stores 65 and the data store queue 62 can be each be referred to as a memory or collectively referred to as a set of memory of the regulated system 60. It is yet further contemplated that the specialized data store 64 can include one or more sets of data such that the specialized data store 64 can be included within the set of memory. The memory can further include a set of data topics which refer to one or more data stores 65 or data store queues 62 based on the topic. Although illustrated as interior to the regulated system 60, it will be appreciated any one or more of the set of memory can be exterior to the regulated system 60 and be accessible through one or more portions of the regulated system 60.

As used herein, the authorized writer 66 or authorized writer function 68 is the representative single function, program, or entity having write-access for the specialized data store 64. In contrast with the authorized writer 66 or authorized writer function 68, the flexible writer 72 is configured to independently (and outside of the normal operation or instruction of the regulated system 60) generate a write-access command to update data, values, or the like, in the specialized data store 64 or any other memory, as described herein. It will be appreciated that the flexible writer 72 and the authorized parameter writer environment 34 can be collectively referred to as a flexible writer environment. As used herein, "flexible" indicates that the respective components are user-accessible to introduce or inject specific actions (such as functional actions, including but not limited to write functions and read functions) in the system 30. In this sense, they are independently introduced actions not initiated by system 30, but may include implementation using system 30 functional elements.

The specialized data store 64 can be operably coupled to the definitions file 50 through the parser 74, which can be configured to receive, analyze or parse at least a portion of the definitions file 50. The parser 74 can generate a parsed definitions file by analyzing at least a portion of the definitions file 50 and identify the portions of the definitions file 50 pertinent to the specialized data store 64 to define a set of parsed information (e.g., the parser 74 can identify the set of procedures, at least one set of systematic data, or the executable operation within the definitions file 50 and convey them directly to the specialized data store 64 within the set of parsed information). The specialized data store 64 can take the parsed information received from the parser 74 and either retrieve a set of requested data related to the parsed information from the set of memory, or send at least a portion of the parsed information to other portions of the regulated system 60 (e.g., the flexible writer 72 or the flexible reader 82).

The regulated system environment 36 can provide an output to or receive an input from one or more external components of the system 30. As used herein, the term "external components" can refer to a component of the system 30 configured to receive an output from or send an input to at least a portion of the regulated system environment 36. A request queue 84 can be further provided within the regulated system environment 36 and be configured to receive an input from the external device. The input, for example, can be a command or a request from the external device for the regulated system 60 to output one or more sets of data. Specifically, the request queue 84 can be configured to trigger a data output from the flexible reader 82 or one or more memory of the set of memory of the regulated system 60. In some instances, the request queue 84 can be used to transmit particular requests to enable or disable data output from the regulated system environment 36. The request queue 84 can temporarily store the requests in either the order from which they were received or by an order of importance.

A non-limiting example of the one or more external device can include a receiving component 86. The receiving component 86 can include a data recorder (e.g., a "black box"), an onboard maintenance system, a verification environment, or any other component or system for which customized is output is desired, including components both internal and external the regulated system environment 36. It is contemplated that the receiving component 86 can be a data communication or data downlink application. It is further contemplated that the receiving component 86 can be other external devices such as, but not limited to, an EFB, or a Software Development Kit (SDK) on the EFB.

As illustrated, the receiving component 86 can include, at least, a request generator 87 with an input 88 to the regulated system 60. The receiving component 86 can further be communicatively coupled to the regulated system by an output 89 from the regulated system 60. Specifically, the input 88, and hence the request generator 87, can be communicatively coupled to the request queue 84. The output 89 can be communicatively coupled to at least the flexible reader 82. As such the receiving component 86 can send requests to at least a portion of flexible reader 82 for one or more sets of data (e.g., data related to the operation of the regulated system 60), via the input 88, and receive, via the output 89, one or more sets of requested data relating to the data that was requested. The output 89 can be further defined as a stream output from the regulated system environment 36 to the receiving component 86. As such, the output 89 can define a continuous stream of data being transmitted from the regulated system environment 36 to the receiving component 86. The data output from at least a portion of the flexible reader 82 can be defined as either periodic or aperiodic data. In other words, the data output from the data store 65 through the output 89 can be sent on a regular, predetermined interval (i.e., periodic data) or be sent upon request (i.e., aperiodic data).

The specialized data store 64 and the flexible reader 82 can be configured to collectively receive an input (e.g., at least the set of procedures including the set of systematic data and executable operations), retrieve data related to the input from one or more memory of the set of memory, and ultimately output the retrieved data from the regulated system 60 and to the receiving component 86. Specifically, the specialized data store 64 can receive the input while the flexible reader 82 can retrieve the data from at least one memory of the set of memory and output the retrieved data to the receiving component 86. Specifically, the specialized data store 64 can be configured to receive the input from the authorized writer 66 instructing it what needs to be output from the regulated system 60. The specialized data store 64 can be further configured to instruct the flexible reader 82 what data needs to be output based on the input received by the specialized data store 64. As such, the flexible reader 82 can be configured to receive and read the instructions from the specialized data store 64 and subsequently retrieve the needed data from one or more memory of the set of memory of the regulated system 60 (e.g., the flexible reader 82 can retrieve data from the set of data stores 65, the set of data store queues 62, or the specialized data store 64). The flexible reader 82 can be further configured to output the data it retrieves from the set of memory to the receiving component 86. It is yet further contemplated that the flexible reader 82 can output an empty subset of data to the receiving component 86. As such, the empty subset of data can be configured to indicate to the receiving component various circumstances of the regulated system 60. For example, the flexible reader 82 can output the empty subset of data when the set of procedures are received by the specialized data store 64. As such, the empty subset of data can act as an indication to the receiving component 86 that the set of procedures were received within the regulated system 60.

As illustrated, the receiving component 86, specifically the request generator 87, can send a request through the input 88 to the flexible reader 82 through the request queue 84. The request from the receiving component 86 can be for the flexible reader 82 to retrieve one or more sets of data from one or more memory of the set of memory. For example, the request from the receiving component 86 can be for the flexible reader 82 to retrieve the set of procedures or at least one set of systematic data which can be received by the specialized data store 64. As such, the flexible reader 82 can receive or otherwise read the set of procedures, the set of systematic data, or the executable operation from the specialized data store 64 and output them through the output 89 to the receiving component 86. Additionally, or alternatively, the receiving component 86 can send, through the request queue 84, instructions similar to the instructions sent by the specialized data store 64 to the flexible reader 82 as described herein. For example, the receiving component 86 can include the set of procedures and instruct the flexible reader 82 what data needs to be retrieved and output from the regulated system 60 regarding the set of procedures. Although not illustrated, it is yet further contemplated that the receiving component 86 can be directly coupled to the specialized data store 64 such that the receiving component 86 can directly write to the specialized data store 64 or otherwise inject the set of procedures directly to the specialized data store 64. As such, the specialized data store 64 can receive these instructions from the receiving component 86 and subsequently request the flexible reader 82 retrieve the necessary data relating to the instructions and output the data to the receiving component 86.

The receiving component 86 can be further configured to be communicatively coupled to other portions of the system 30. Specifically, the receiving component 86 can be communicatively coupled to at least a portion of the programming environment 32 such that the receiving component 86 can receive one or more sets of decoder files from the programming environment 32. The programming environment 32 can allow the receiving component 86 to decode data obtained, acquired, or otherwise received from at least a portion of the regulated system environment 36. For example, data received by the receiving component 86 from at least a portion of the regulated system 60 can be serialized (e.g., serialized bytes). The receiving component 86 can decode the serialized data based on information contained within the programming environment 32, and specifically with one or more decoder files received from the programming editor 40.

While the system 30 illustrates the programming environment 32, the authorized parameter writer environment 34, the regulated system environment 36, and the receiving component 86 are illustrated proximate to each other, non-limiting aspects of the disclosure will be understood wherein temporal or physical spacing occurs between the respective environments 32, 34, 36 or the receiving component 86. For example, the programming environment 32 is likely utilized well before the regulated system 60 is implemented in any further environment, such as the FMS of an aircraft. Similarly, the authorized parameter writer environment 34 can include a mobile development component, such as a Portable Electronic Device (PED) (e.g., a laptop, tablet, etc.) that can be transportable relative to the otherwise fixed regulated system 60 (e.g. that can be "fixed" relative to a particular aircraft). Additionally, it will be understood that each respective environment 32, 34, 36 can include respective interfaces for utilizing the environment 32, 34, 36, including but not limited to user interfaces (e.g. graphical user interfaces, interactive devices such as mice), and connective interfaces (universal serial buses, Ethernet communication ports, or the like). It will be yet further understood that various portions of the system 30 can be located within other various portions of the system 30, or otherwise be its own component of the system 30. For example, although illustrated exterior the regulated system 60, the definitions file 50 can be included within the regulated system 60. As another non-limiting example, although illustrated interior the programming environment 32, the system source code 42 can be exterior the programming environment 32 such that the system source code 42 can be included within another portion of the system 30 and the programming environment 32 can extract the system source code 42 from wherever the system source code 42 is located.

It will be yet further understood that various portions of the system 30 can by bypassed or otherwise excluded from the system during certain operations or installations of the system 30. For example, if the system 30 were to be placed on an aircraft 10 during flight such that the regulated system 60 includes the FMS, the flexible writer 72 can be excluded or otherwise bypassed. As such, the flexible reader 82 can receive parsed definitions file from the specialized data store 64. It will be further appreciated that various portions of the system 30 shown to be discrete components from one another can be included within a single housing or in other words be a single component. For example, it is contemplated that the receiving component 86 and the and the authorized parameter writer 52 can reside in the same single housing or alternatively be the same device. As such, the request generator 56 could include an input to the request queue 84 through the input 88.

During programming activities (e.g. in the programming environment 32), the configuration tool 43 can include or be otherwise aware of prior knowledge of how data is maintained in the set of memory, the platform environment, the processor, or the like, of the regulated system 60. In some implementations, the configuration tool 43 or other system component can be configured or adapted to parse the regulated system source code 42 (or a derivative thereof) to provide a list of all available memory of the set of memory within or otherwise accessible through the regulated system 60. The definition file 50 can instruct or otherwise inform one or more portions of the regulated system 60 regarding the identity of the data stores, data store queues, or a combination thereof. For instance, in one non-limiting example, the definitions file 50 can contain a plain memory layout of the embedded system, and also contain data types and variable names to make it easier to define the input parameter 54. In non-limiting examples, the definitions file 50 can be communicatively coupled to the authorized parameter writer environment 34, the authorized parameter writer 52 interface, the request generator 56, the flexible writer 72 or a subset thereof.

In some implementations, in addition to the regulated system source code 42, the configuration tool 43 can analyze or otherwise use one or more binary object files of the regulated system 60 to determine the memory layout of the regulated system 60, or one or more network configuration definitions to know the size of a byte stream, the depth of buffers, or a set of configuration identifiers. For example, a compiler can optionally create a representation specification, which can be configured to explain or otherwise define a memory layout of one or more sets of data within a corresponding memory. It is contemplated that a tool included within the programming environment 32 can combine the representation specification with an understanding of data composition and inheritance that is extracted from the system source code 42. As such, the memory layout of one or more sets of data within a corresponding memory can be inferred through the programming environment 32. The representation specification. The representation specification can contain tables describing the memory layout. The configuration tool 43 can use the context clause or representation specification as an input in addition to the regulated system source code 42 (which can still be used to determine dependencies of nested data structures). Based on a target processor architecture (e.g., the processor which implements the regulated system 60), the configuration tool 43 can also be aware of byte alignment and endianness to adjust offsets in the loadable configuration file illustrated as the definitions file 50.

As shown, in some non-limiting aspects, the definitions file 50 can include additional information for each identified data store, data store queue, or the like. The additional information can include, but is not limited to, size, parameters, data type, engineering units, or the like. In some implementations, the definitions file 50 can specify or define certain data groups (e.g. specific memory of the set of memory) that can be written or overwritten during runtime of the regulated system 60.

In some implementations, in addition to specifying or defining data store or data store queue definitions, the definitions file 50 can also specify or define particular data entries (e.g., parameters) within specific memory of the set of memory.

In particular, the loadable configuration file (the definitions file 50) can further provide or enable the authorized parameter writer 52, the flexible writer 72, or the specialized data store 64 to encode parameter data to be written to one or more memory of the set of memory accessible the specialized data store 64. For example, encoded parameter data to be written to the set of memory can be a set of serialized data (e.g., serialized bytes). Additionally, or alternatively, the definitions file 50 can further provide operating conditions for one or more components within the regulated system 60. For example, the definition file 50 can define the set of memory for the flexible reader 82 to access.

During runtime, which can include runtime operation of the aircraft, or for example, testing or maintenance-based runtime of the regulated system 60, a user, function, system, or program can desire a change in parameter value of one or more memory of the set of memory. Such a flexible change to parameter value or a definition of one or more the set of procedures (e.g., a change in at least a portion of the systematic data defined by the set of procedures) can be enabled by way of the system 30 described herein.

For example, a user, function, system, or program can access the authorized parameter writer environment 34 in order to generate a request to update or otherwise write or overwrite a specific parameter (or set of parameters), indicated by the definitions file 50. The request is generated by the request generator 56, as encoded or informed by the loadable configuration files, and provided to the regulated system 60 or the flexible writer 72 by way of communication 58. Further, a user, function, system or program can utilize various portions of the system 30 to input or otherwise generate a loadable configuration file which defines or contains the set of procedures defining the set of systematic data and the executable operation of the regulated system 60. As discussed herein, the loadable configuration file can further include instructions for the specialized data store 64 and the flexible reader 82. These instructions can, for example, provide guidance for the specialized data store 64 and the flexible reader 82 of the specific memory of the set of memory and the data stored within the set of memory. The definitions file 50 can further include instructions for the specialized data store 64 on how to interpret the input containing at least a subset of the set of procedures that the specialized data store 64 can accurately and efficiently instruct the flexible reader 82 on which data needs to be output from the regulated system 60.

The flexible writer 72 can be configured or adapted to provide flexible access of the regulated system 60 and intercept or replace an authorized instruction communication 70 from the authorized writer 66 with another communication 78 (shown schematically intercepting instruction communication 70 in box 80), and replace, inject, or otherwise update the authorized instruction communication 70 to include the requested parameter update (e.g., an update to the set of procedures, or an update to at least a portion of the systematic data defined by the set of procedures and defined within the definitions file 50). In one non-limiting example, the replacing, injecting, or otherwise updating the authorized instruction communication 70 can further be encoded or informed by way of the definitions file 50 or any other loadable configuration file. The updated authorization instruction communication with the requested parameter update is then delivered to the specialized data store 64, where the modified authorized write-access instruction is executed, or otherwise written to memory.

It is contemplated that a feedback mechanism for the writer can be included (e.g. the authorized parameter writer 52, the flexible writer 72, or a combination thereof) to know that the writing was successful. As illustrated, the flexible writer 72 can provide feedback to the authorized parameter writer 52. This can occur, for example, during runtime for deterministic (automated) runtime of the regulated system 60. In another non-limiting example, the feedback mechanism can include notification to or for the writer when a subscriber (e.g., the flexible reader 82) of the set of memory has actually read the data or event change requested. In yet another non-limiting example, a feedback can be provided from the specialized data store 64 to confirm when the write from the flexible writer 72 has occurred.

Figure 3:
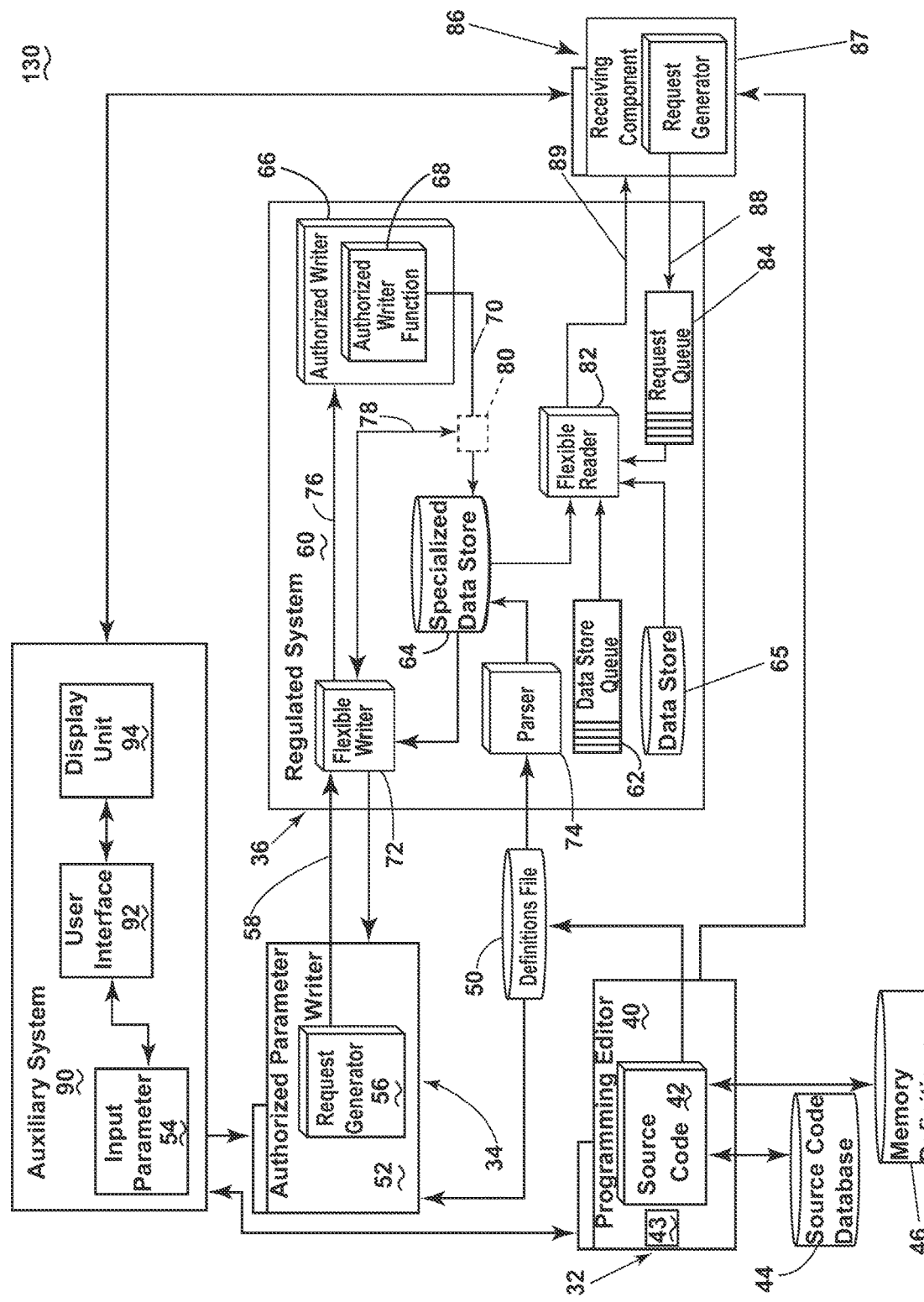
FIG. 3 illustrates an example schematic view of an exemplary system to provide flexible write- and read-access of the regulated system of FIG. 2, further including an exemplary auxiliary system in accordance with various aspects described herein.

FIG. 3 illustrates an exemplary system 130 similar to the system 30 of FIG. 2, in that it includes the same components of the system 30, however, the system 130 further includes an auxiliary system 90 configured to input one or more sets of data (e.g., data relating to one or more procedures of the sets of procedures) into the regulated system environment 36. The auxiliary system 90 can include a user interface 92 operatively coupled to the input parameter 54 and a display unit 94. As discussed herein, the auxiliary system 90 can any suitable system or component configured to provided updated or dynamic runtime instructions into the regulated system 60 either at startup or during runtime of the regulated system 60. A non-limiting example of the auxiliary system 90 includes a test system configured to input one or more sets of test data (e.g., test data relating to one or more procedures) into the regulated system 60.

The user interface 92 is configured to receive an input from a user of the auxiliary system 90. The user interface 92 can be any one or more of a haptic feedback screen, a keyboard, a monitor, PED, or the like. An input parameter 54 can be defined through the auxiliary system 90 via the user interface 92, which can be configured such that an input from the user can be interjected into the system 30 through the input parameter 54. The input parameter 54 from the user can be, for example, the set of procedures defining the systematic data and the executable operation for the regulated system environment 36 to simulate or operate at. Specifically, in terms of the test system, the input from the user can be the set of procedures defined as the set of test procedures. As such, the systematic data can be defined as the test data while the executable operation can be defined as the executable test operation. The input from the user can further be a flight procedure that defines a sequence of events (e.g., an approach following an arrival procedure) an altitude, a temperature, a wind speed, a threshold, or any combination thereof. It is further contemplated that the user interface 92 can include a communication pathway from one or more components of the system 130 to at least a portion of the auxiliary system 90. Specifically, the communication pathway can communicatively couple the auxiliary system 90 to authorized parameter writer environment 34. As such, the authorized parameter writer environment can receive the input parameter 54 can provide it to a portion of the regulated system 60 (e.g., the flexible writer 72) which can interject the input parameter 54 into the instruction communication 70 as described herein.

The display unit 94 can be configured to display one or more inputs from the user or one or more sets of data from the receiving component 86. The display unit 94 can include one or more screens for displaying data received or otherwise input through the auxiliary system 90. It is contemplated that the display unit 94 can be included within the user interface 92 such that the display unit 94 and the user interface 92 can be collectively referred to as a Multi-Function Control Display Unit (MDCU). In other words, the user interface 92 and the display unit 94 can collectively include one or more screens, buttons, or other controls for receiving and displaying user input and additionally displaying one or more sets of data from other portions of the system 130.

It is further contemplated that the auxiliary system 90 can be operatively coupled to the receiving component 86 such that a user can send requests to the receiving component or receive one or more sets of data from the receiving component 86. Non-limiting examples include the user using the user interface 92 to request the receiving component 86, specifically the request generator 87, retrieve one or more sets of data from the regulated system 60. For example, the user could request that the receiving component 86 retrieve the set of test procedures, a specific set of test data, the executable test operation or a combination thereof from the regulated system 60. As described herein, the flexible reader 82 can receive this request and subsequently retrieve the requested data from one or more memory of the set of memory and output the requested data through output 89 to the receiving component 86, which can be directed back to the auxiliary system 90 from the receiving component 86. It is yet further contemplated that the user can request an update to at least a portion of the set of test procedures or otherwise inject the set of test procedures into the regulated system 60.

As illustrated, the auxiliary system 90 can be operably coupled to at least a portion of the programming environment 32 such that the test system can receive from or send to the programming environment 32 one or more sets of procedures or other sets of data. For example, the auxiliary system 90 can be operably coupled to the programming environment 32 such that at least a portion of the system source code 42 can be transmitted directly to the auxiliary system 90 to be on the display unit 94 (e.g., the set of memory defined by the programming environment 32 can be sent to the auxiliary system 90 to be displayed on the display unit 94). In yet another example, the auxiliary system 90 can be utilized by the user to input at least a portion of the test procedures directly to the programming environment 32. The programming environment 32 can subsequently utilize the input from the user from the auxiliary system 90 to generate the definitions file 50 including the set of procedures through the user interface 92. Additionally, or alternatively, the user interface 92 can be used in place of or in conjunction with the programming editor 40 interface or vice-versa to code, edit, or otherwise develop the system source code 42. As both the user interface 92 and the programming editor 40 interface can be utilized by a user to select or view the set of memory or the set of procedures, it will be appreciated that both the user interface 92 and the programming editor 40 interface can be defined as an interface that enables a user to select the set of memory or the set of procedures from a set of available memory of the set of memory or a set of available procedures, respectively.

As a non-limiting example, at least a portion of the programming environment 32, specifically the configuration tool 43, can be configured to obtain a data file (e.g., from the memory definition 46 information) that describes a set of available memory of the set of memory. The programming environment 32 or the configuration tool 43 can then provide to the user a list of available memory of the set of memory through the user interface 92 or the programming editor 40 interface. Once the user selects at least one memory from the list of available memory of the set of memory, the programming environment 32 or the configuration tool 43 can generate the loadable configuration file (e.g., the definitions file 50) based at least in part on the available memory of the set of memory selected by the user. It will be appreciated the generation of the loadable configuration file can further be based in part on the structure of the data in a corresponding memory, a platform information, a processor information, or one or more requirements of the receiving component 86. It will be further appreciated that the operations of the programming environment 32 can occur when the regulated system 60 is offline. In other words, the programming environment can be configured to obtain the data file that describes the set of available memory of the set of memory during a period of time that is not during the runtime of the regulated system 60.

Figure 4:
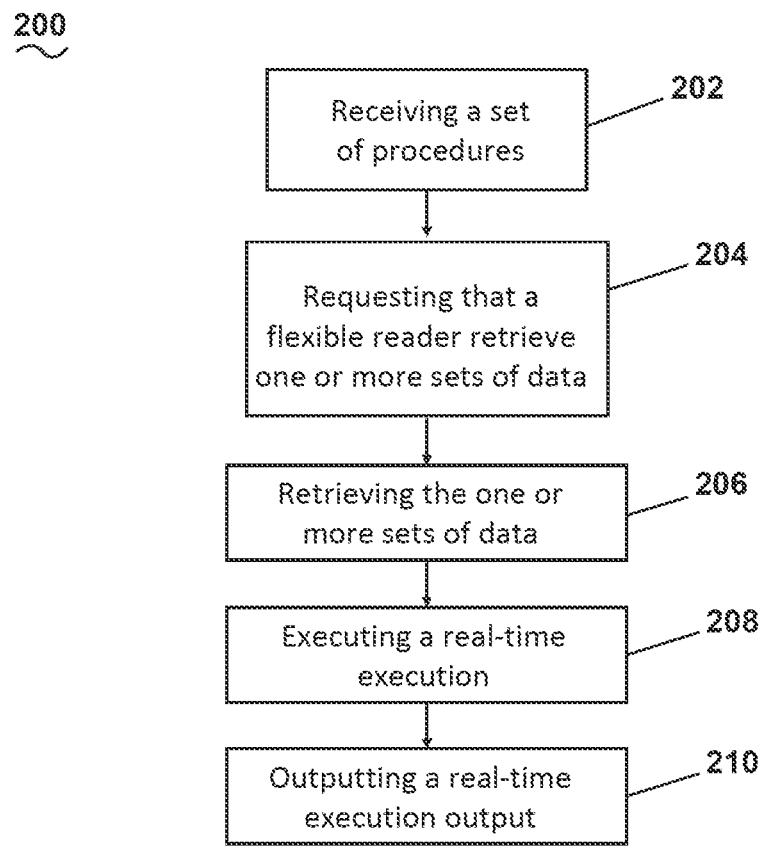
FIG. 4 illustrates a method of providing read-access of a set of procedures of the system of FIG. 2, in accordance with various aspects described herein.

FIG. 4 illustrates a non-limiting example method 200 of providing flexible read-access of the set of procedures during runtime of the regulated system 60 of FIG. 2 and FIG. 3. It will be appreciated that the method 200 can be applied to either system 30, 130, or any other suitable system. For example, the method 200 can be applied to a system including the auxiliary system 90 (e.g., a test system), or be used during flight of the aircraft 10 such that the method 200 can be applied to a flight system. As such, it will be appreciated that although described in terms of the set of procedures defining the set of systematic data and the executable operation, that the set of procedures can be defined as the set of test procedures (e.g., the test system) defining the set of test data and the executable test operation, or the set of procedures can be defined as a set of flight procedures (e.g., the flight system) defining a set of flight data and a executable flight operation.

At least a subset of the set of procedures can be received, by the specialized data store 64, within the regulated system 60, at 202. As discussed herein, the set of procedures can define the set of systematic data and the executable operation of the regulated system 60. Each subset of the procedures can refer to a single procedure or a smaller set (e.g., two procedures) of the set of procedures. In other words, the specialized data store 64 can receive, at 202, the subset of the procedures defining the systematic data and executable operation for that singular procedure or smaller set of procedures. The specialized data store 64 can subsequently request that the flexible reader 82 retrieve or read one or more sets of data, at 204. The sets of data that the specialized data store 64 requests the flexible reader 82 retrieve can be further defined as a set of data directly relating to at least the subset of procedures of the set of procedures. As a non-limiting example, the set of procedures can define the executable operation of a descent of the aircraft 10. One non-limiting subset of the procedures of the set of procedures can be a change in altitude from a cruise altitude to an approach altitude (e.g., an altitude where an approach phase for the aircraft 10 begins). In such a case, the set of data, which the specialized data store 64 can request for this specific non-limiting example, can be a variable thrust of the aircraft 10. The set of data can subsequently be retrieved, by the flexible reader 82, to define a set of retrieved data, at 206. The set of data can be retrieved, by the flexible reader 82, from any suitable memory of the regulated system 60 or otherwise accessible by the regulated system 60 such as, but limited to data store within the data store queue 62, the data store 65, the specialized data store 64, or any combination thereof. With the set of retrieved data, a real-time execution, by at least a portion of the regulated system 60 (e.g., the flexible reader 82), of the executable operation based on the set of retrieved data (the set of data retrieved by the flexible reader 82), at 208.

A real-time execution output can then be output, by the flexible reader 82, to the receiving component 86, at 210. As used herein, the term "real-time execution output" can refer to an output of data from the regulated system relating to the executable operation. The outputting of the real-time execution output can be in the form of large clumps of retrieved data that are transmitted to the receiving component 86 during periodic intervals, aperiodic intervals, or any combination thereof. For example, a portion of the regulated system 60 (e.g., the flexible reader 82) can interleave aperiodic data with periodic data. In other words, the outputting of the retrieved data can be sent to the receiving component 86 as a continuous bit stream with both periodic and aperiodic data interleaved. In some cases, it is contemplated that a set of periodic data and a set of aperiodic data can be output at the same time. In other instances, periodic data can be continuously output from the specialized data store 64 to the receiving component 86. Other sets of data can be interleaved with the data that is continuously output such that it does not disturb or otherwise interrupt the continuous output of the periodic data. In any case, the retrieved data can include a header with a time stamp of when the data was retrieved by the flexible reader 82. The real-time execution output can include the real-time execution of the executable operation that was executed, at 208. In terms of the previously described non-limiting example where the set of procedures defined the executable operation of the descent of the aircraft 10, and the set of data retrieved by the flexible reader 82 was the variable thrust, the variable thrust can be used during the executable operation of the descent of the aircraft 10. As such, a descent profile that outlines the path the aircraft 10 will take during descent and the various avionic parameters (e.g., variable thrust, altitude, etc.) of the aircraft 10 along the descent, can be output through as the real-time execution output to the receiving component. The receiving component 86 can subsequently operate the aircraft 10 according to the real-time execution of the regulated system 60, or transmit at least a portion of the real-time execution output to the auxiliary system 90. For example, in the case where the auxiliary system 90 is the test system, the regulated system 60 can simulate the descent profile of the aircraft 10 and output the real-time execution output to the receiving component 86 and subsequently to the test system where the descent profile, including one or more sets of data points (e.g., variable thrust along the descent profile), can be displayed. It will be appreciated that the method 200 can be repeated for each subset of procedures of the set of procedures until the all procedures of the set of procedures have been executed and output to the receiving component 86 through the real-time execution output.

The sequences depicted is for illustrative purposes only and is not meant to limit the method 200 in any way as it is understood that the portions of the method can proceed in a different logical order, additional or intervening portions can be included, or described portions of the method can be divided into multiple portions, or described portions of the method can be omitted without detracting from the described method. For example, the method 200 can include various other intervening steps. The examples provided herein are meant to be non-limiting.

In one non-limiting example, the method 200 can be preceded by a method for flexible write-access of the set of procedures during runtime of the regulated system 60. As previously noted, although described in terms of the set of procedures that define the set of systematic data and executable operation, that the method described herein of providing flexible write-access can also be applied to any suitable set of procedures such as, but not limited to, the set of test procedures or the set of flight procedures defining the set of test data and the executable test operation, or the set of flight data and the executable flight operation, respectively. The method can begin by receiving, by the flexible writer 72, at least a subset of procedures the set of procedures within the regulated system 60. Specifically, the flexible writer 72 can receive the at least a subset of procedures from the authorized parameter writer 52. The authorized writer 66 can then be instructed, by the flexible writer 72, to generate the runtime instruction communication or authorized communication. The instructions to generate the runtime instruction communication can be for the authorized writer 66 to write to the specialized data store 64. The runtime instruction communication can be subsequently sent from the authorized writer 66 to the specialized data store 64. The flexible writer 72, however, can intercept and replace the runtime instruction communication at box 80, before reaching the specialized data store 64. As such, the flexible writer 72 can replace the runtime instruction communication during a delivery from the authorized writer 66 to the specialized data store 64 with a replacement communication including, at least, the subset of the procedures or an updated set of procedures. It is contemplated that the replacing of the runtime communication can include injecting the set of data into the runtime instruction communication or intercepting the runtime instruction communication. Alternatively, the replacing the runtime communication can include interjecting an identical set of data to the current runtime instruction communication or not interjecting any set of data at all. It will be yet further appreciated that the replacing of the runtime instruction communication can include replacing at least a portion of the loadable configuration file (the definitions file 50), which was previously loaded onto the regulated system 60. The replacing of the loadable configuration file can be an update to a portion of the loadable configuration file, or a full replacement of the previously loaded loadable configuration file. In such cases it will be appreciated that the runtime instruction communication received by the specialized data store 64 can be identical to the runtime instruction communication generated by the authorized writer 66. It will be further appreciated that replacing the runtime instruction communication can include executing the replacement communication based at least on an assumption that the replacement communication is an authorized communication. As used herein, the term "authorized communication" can be defined as an instruction or command that has been received form a source that has authority to write to at least a portion of the regulated system 60. Once the replacement communication is received by the specialized data store 64, the method 200 of providing flexible read-access to the regulated system 60 can then begin by the receiving, by the specialized data store 64, the subset of the procedures, at 202. The method described herein for providing write-access and read-access of the set of procedures can then be repeated for each subset of procedures of the set of procedures.

In yet another non-limiting example the set of procedures can be received by an input from the auxiliary system 90 (e.g., a user input on the user interface 92). The auxiliary system can generate the input parameter 54 related to the set of procedures. For example, the input parameter 54 can be an updated subset of the procedures, or a single piece of systematic data to be redefined or input into the set of procedures within the regulated system 60. The input parameter 54 from the regulated system can then be ultimately input into the flexible writer 72 where it can then be interjected at box 80 to replace, or update the runtime instruction communication. A non-limiting example of this method can be in terms of the auxiliary system 90 being defined as the test system. In such a case, a user can utilize the user interface 92 to select, input, or update at least a subset of the test procedures of the set of test procedures. The input parameter 54 can then be formed to include, at least, the subset of the test procedures, which can ultimately be injected, or input at box 80 within the regulated system 60. As such, the real-time execution output can ultimately be output to the receiving component 86 according to the input received within the auxiliary system 90.

In yet another non-limiting example, the method 200 can include providing the auxiliary system 90 (e.g., the user interface 92) or an Application Programming Interface (API) (e.g., the programming editor 40 interface) at least a subset of the procedures to select from. It is contemplated that the auxiliary system 90 or the API can receive at least a subset of the procedures by at least a portion of the configuration tool 43. The auxiliary system 90 or the API can then be used to select the desired subset of procedures of the set of procedures. Additionally, or alternatively, the auxiliary system 90 or the API can be used to select one or more sets of systematic data. This selection can ultimately be received, via the configuration tool 43. As a non-limiting example of the auxiliary system 90 being the test system, the user can select or input at least a subset of the set of test procedures through the user interface 92 to define a set of selected data, which can either be input directly into the regulated system 60 through the authorized parameter writer 52, or directly to the programming environment 32. If the latter occurs, the loadable configuration files based at least in part on the selected data can then be generated, by the configuration tool 43 or by another portion of the programming environment 32. The selected data can then be supplied to a portion of the regulated system 60 (e.g., the specialized data store 64), and the real-time execution output, according to the selected data, can ultimately be output to the receiving component 86 according to the methods described herein.

In yet another non-limiting example, a set of decoder files, similar to the loadable configuration files, can be received via the receiving component 86. The decoder files can then subsequently be utilized, by the receiving component 86, to convert the real-time execution output from the regulated system 60 into a human-readable format or machine-readable format to define a readable real-time execution output. The format of the readable real-time execution output can be defined by the user or through a predefined preference in the definitions file 50. The readable real-time execution output can subsequently be sent to the auxiliary system 90. The readable real-time execution output can then be displayed to the user of the auxiliary system 90 in a human-readable format (e.g., the readable real-time execution output can be displayed on the display unit 94). As discussed herein, the auxiliary system 90 can include an input directly in to the regulated system 60 through the receiving component 86. Specifically, the auxiliary system 90 can submit a request or input data by sending it to the receiving component 86 which can in turn use the request generator 87 to generate and send the request to the request queue 84 through input 88. The data from the auxiliary system 90 can then be input into the flexible reader 82. As such, the user can submit a request, through the user interface 92. The request can then be transmitted to the receiving component 86 and subsequently to the request queue 84. The request can be received by the flexible reader 82 can be interpreted by the flexible reader 82 in the same manner as if it were a request received from the specialized data store 64, at 204. In other words, the flexible reader 82 can receive this request and obtain a set of requested data from a corresponding memory in order to create the real-time execution output according to the request from the receiving component 86. Ultimately, at least a portion of the regulated system 60 can then output the real-time execution output related to the request.

In yet another non-limiting example, the method 200 can including comparing the real-time execution output with a respective expected output relating to the set of procedures. In other words, at least a portion of the system 30, 130 (e.g., the receiving component 86 or the auxiliary system 90) can compare the real-time execution output received from the regulated system 60 and based on the set of procedures, with an expected output based on the same set of procedures. It is contemplated that the expected output can be a predefined, precalculated, or otherwise simulated output that would occur if the executable operation defined by the set of procedures were to be executed within the regulated system 60. The system 30, 130 can subsequently record one of either a passing or a failing of at least a subset of the procedures of the set of procedures based on the comparison. In other words, the system 30, 130 can determine if a portion of the real-time execution output differs from a corresponding portion of the expected output. If they do differ, the system 30, 130 can flag this difference, which can subsequently be displayed or corrected through use of the auxiliary system 90 (e.g., the difference can be displayed on the display unit 94 to the user and the user can subsequently use the user interface 92 to fix the difference through an updated input parameter 54).

Figure 5:
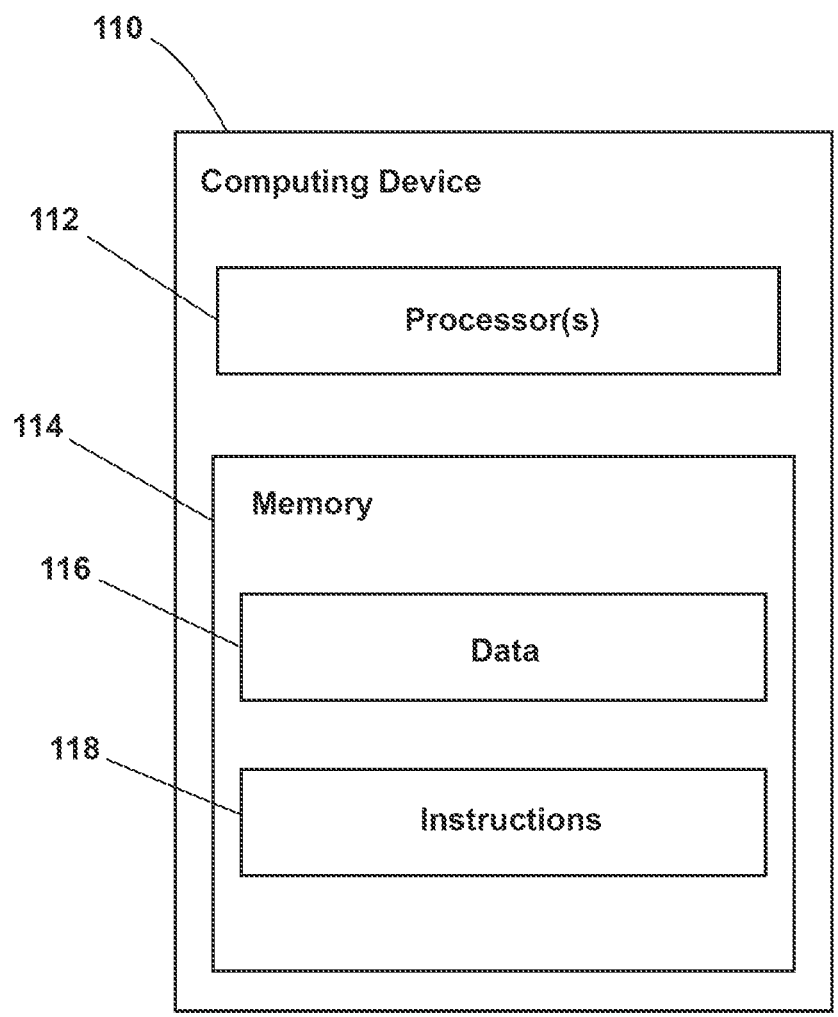
FIG. 5 illustrates an example schematic view of a computing device, in accordance with various aspects described herein.

FIG. 5 schematically illustrates one or more computing devices of the system 30, 130. Each of the configuration tool 43, the programming environment 32, the authorized parameter writer environment 34, the flexible writer 72, or the regulated system 60, or components thereof, can be implemented by one or more computing devices. As shown, the computing device 110 can be referred to as a controller module or a microcontroller. The computing device 110 can be stand-alone or can be embedded into a computing system or environment 32, 34, 36. In another non-limiting example, the respective components, such as the authorized parameter writer environment 34, can be located on or as a subcomponent of another vehicle or aircraft, or as an external tool.

The computing device 110 can include one or more processors 112 and a memory 114. The one or more processors 112 can be any suitable processing device, including, but not limited to, a processor core, a microprocessor, an Application Specific Integrated Circuit (ASIC), a Field Programmable Gate Array (FPGA), a controller, a microcontroller, a controller module, or the like. In another non-limiting example, the one or more processors 112 can include of processors or processor execution cores that are operatively connected. The memory 114 can include one or more non-transitory computer-readable storage mediums, such as RAM, ROM, EEPROM, EPROM, flash memory devices, magnetic disks, the like, or a combination thereof. The memory 114 can store data 116, such as data stores 65 or data store queues 62. The memory 114 can also store instructions 118 which are executed by the processor 112 to perform operations or functions described by the present disclosure.

Benefits of the present disclosure include a method and system for supplying a definitions file to a regulated system is not as bandwidth limited when compared to traditional systems. For example, traditional systems rely on a pre-defined or already compiled definitions file to define the operation of the regulated system (e.g., define the set of procedures to be input into the regulated system). As the definitions file is already defined upon startup of the regulated system, in order to update the definitions file, the regulated system would need to be re-compiled. As described herein, re-compilation requires re-certification, which ultimately requires re-verification. This results in an additional costs and additional testing burden. Further, the size of the definitions file is limited to ensure the definitions file does not exceed the bandwidth restrictions of the system. As such, in order to run a full set of procedures or run the system according to an updated set of procedures, additional bandwidth can be needed, which can require either additional systems or additional processing capabilities to increase the bandwidth. The system as described herein, however, provides for flexible read-access and flexible write-access to the regulated system such that the regulated system does not need to be re-compiled, re-certified, or re-verified when updating the input (e.g., the definitions file) of the regulated system. Specifically, the flexible reader and the specialized data store allow for flexible read-access of the memory within the regulated system to allow of the real-time execution output based on the set of procedures received within the regulated system to be output to the receiving component. The flexible writer allows for flexible write-access to the specialized data store in order to dynamically or flexibly update at least a subset of the procedures during runtime or startup of the regulated system. Further, as the set of procedures can be dynamically updated, written, and read within the regulated system, this allows of the definitions file to be smaller in size and only include information that is crucial to the regulated system upon startup (e.g., the location of each memory of the set of memory, or at least a subset of the procedures). The flexible write-access can then allow for the remaining procedures of the set of procedures to be input during runtime of the regulated system. As such, the bandwidth restrictions of the system are not exceeded. It will be appreciated that all of this can be done without the need to re-compile, re-certify, or re-verify the regulated system thus eliminating the additional cost and additional testing burden when compared with trinational systems.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

To the extent not already described, the different features and structures of the various aspects can be used in combination with others as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

A system for read-access of a regulated system, comprising a set of procedures, each of the set of procedures defining a respective set of systematic data and an executable operation, a specialized data store of the regulated system, the specialized data store being configured to receive at least a subset of procedures, at least one memory including at least one set of data relating to the set of procedures, a receiving component communicatively coupled to the regulated system, and configured to request a real-time execution of the executable operation on the regulated system based on the set of procedures, and receive a real-time execution output of the regulated system, and a flexible reader authorized for read-access to the specialized data store and the at least one memory, the flexible reader being configured to, in response to receiving a request from the specialized data store to retrieve the at least one set of data, retrieve the at least one set of data from the at least one memory The system of any preceding clause further including a system for write-access, comprising an authorized writer communicatively connected with the specialized data store and authorized for write access to the specialized data store by way of generating a runtime instruction communication delivered from the authorized writer to the specialized data store, the runtime instruction communication defining authorized data to write to the specialized data store, and a flexible writer that is not authorized for write access to the specialized data store, and adapted to receive the set of procedures, communicatively connected with the authorized writer, and configured to communicate instruction to the authorized writer to generate a runtime instruction communication, and replace the runtime instruction communication, during the delivery from the authorized writer to the specialized data store, with a respective subset of procedures such that the respective subset of procedures is committed to the specialized data store.

The system of any preceding clause wherein the flexible writer can be configured to replace at least a portion of a loadable configuration file loaded on the regulated system.

The system of any preceding clause wherein the respective subset of procedures includes a regulated system parameter, and the flexible writer is configured to overwrite the regulated system parameter by way of replacing the runtime instruction communication.

The system of any preceding clause wherein the regulated system is an avionics system.

The system of any preceding clause wherein the system is an avionics system.

The system of any preceding clause wherein the avionics system is configured for in-flight use.

The system of any preceding clause wherein the avionics system includes a Flight Management System.

The system of any preceding clause wherein the flexible reader is further configured to provide the real-time execution output from the regulated system and to the receiving component.

The system of any preceding clause wherein the regulated system is operably coupled to a test system and the set of procedures is a set of test procedures, each of the set of test procedures defining a respective set of test data and an executable test operation.

The system of any preceding clause wherein the respective set of test data includes flight test data for the regulated system.

The system of any preceding clause wherein the regulated system is a regulated ARINC system.

The system of any preceding clause wherein the regulated system is regulated by at least one of an ARINC 664 standard, an ARINC 429 standard, an ARINC 825 standard, or a RS-422 standard.

The system of any preceding clause wherein the respective set of data is related to the respective executable operation.

The system of any preceding clause, further comprising an interface configured to enable a user to select one or more procedures of a set of procedures, and wherein the at least a subset of the selected set of procedures is received by the specialized data store.

A method for flexible read-access of a set of test procedures during runtime of a regulated system, each of the set of test procedures defining a respective set of test data and an executable test operation, the method comprising receiving, by a specialized data store, at least a subset of the test procedures, requesting, by the specialized data store, that a flexible reader retrieve one or more sets of data relating to the subset of the test procedures, retrieving, by the flexible reader, the one or more sets of data relating to the subset of the test procedures from at least one memory, executing, by a portion of the regulated system, a real-time execution of the executable test operation based on the data retrieved by the flexible reader, and outputting, by the flexible reader, a real-time execution output including the real-time execution of the executable test operation from the regulated system and to a receiving component.

The method of any preceding clause, further comprising providing flexible write-access of the set of test procedures during runtime of the regulated system prior to the receiving the set of test procedures, and including receiving at least a subset of the test procedures by a flexible writer not authorized to write to the specialized data store, instructing, by the flexible writer, an authorized writer to generate a runtime instruction communication authorized to write to the specialized data store, replacing the runtime instruction communication during a delivery from the authorized writer to the specialized data store with a replacement communication including the subset of the test procedures, and executing the replacement communication and writing replacement communication to the specialized data store.

The method of any preceding clause, further comprising repeating the method for each procedure of the set of test procedures.

The method of any preceding clause, further comprising receiving a user input through a user interface for a user to select one or more test procedures from the set of test procedures, and wherein the set of test procedures selected by the user are received by the flexible writer.

The method of any preceding clause wherein replacing the runtime instruction communication includes at least one of modifying the runtime instruction communication to include the set of test data, injecting the runtime instruction communication with the set of test data, or intercepting the runtime instruction communication.

The method of any preceding clause wherein the replacing the runtime instruction communication includes replacing at least a portion of a loadable configuration file loaded on the regulated system.

The method of any preceding clause wherein executing the replacement communication includes executing the replacement communication based at least on an assumption that the replacement communication is an authorized communication.

The method of any preceding clause, further comprising comparing the real-time execution output with a respective expected output of the respective test procedure, and recording one of a passing of the respective procedure or a failing of the procedure based on the comparison.

The method of any preceding clause wherein the regulated system is an avionics system.

The method of any preceding clause wherein the avionics system is configured for in-flight use.

The method of any preceding clause wherein the avionics system includes a Flight Management System.

The method of any preceding clause wherein the regulated system is a regulated ARINC system.

The method of any preceding clause wherein the regulated system m is regulated by at least one of the ARINC 664 standard, ARINC 429 standard, ARINC 825 standard, or the RS-422 standard.

A method for flexible read-access of a set of procedures during runtime of a regulated system, each of the set of procedures defining a respective set of systematic data and an executable operation, the method comprising receiving, by a specialized data store, at least a subset of the procedures, requesting, by the specialized data store, that a flexible reader retrieve one or more sets of data relating to the subset of the procedures, retrieving, by the flexible reader, the one or more sets of data relating to the subset of the procedures from at least one memory, executing, by a portion of the regulated system, a real-time execution of the executable operation based on the data retrieved by the flexible reader, and outputting, by the flexible reader, a real-time execution output including the real-time execution of the executable operation from the regulated system and to a receiving component.

The method of any preceding clause, further comprising providing flexible write-access of the set of procedures during runtime of the regulated system prior to the receiving the set of procedures, and including receiving at least a subset of the procedures by a flexible writer not authorized to write to the specialized data store, instructing, by the flexible writer, an authorized writer to generate a runtime instruction communication authorized to write to the specialized data store, replacing the runtime instruction communication during a delivery from the authorized writer to the specialized data store with a replacement communication including the subset of the procedures, and executing the replacement communication and writing replacement communication to the specialized data store.

The method of any preceding clause, further comprising repeating the method for each procedure of the set of procedures.

The method of any preceding clause wherein the replacing the runtime instruction communication includes replacing at least a portion of a loadable configuration file loaded on the regulated system.

The method of any preceding clause, further comprising receiving a user input through a user interface for a user to select one or more procedures from the set of procedures, and wherein the set of procedures selected by the user are received by the flexible writer.

The method of any preceding clause wherein replacing the runtime instruction communication includes at least one of modifying the runtime instruction communication to include the set of data, injecting the runtime instruction communication with the set of data, or intercepting the runtime instruction communication.

The method of any preceding clause wherein executing the replacement communication includes executing the replacement communication based at least on an assumption that the replacement communication is an authorized communication.

The method of any preceding clause, further comprising comparing the real-time execution output with a respective expected output of the respective procedure, and recording one of a passing of the respective procedure or a failing of the procedure based on the comparison.

The method of any preceding clause wherein the regulated system is an avionics system.

The method of any preceding clause wherein the avionics system is configured for in-flight use.

The method of any preceding clause wherein the avionics system includes a Flight Management System.

The method of any preceding clause wherein the regulated system is a regulated ARINC system.

The method of any preceding clause wherein the regulated system m is regulated by at least one of the ARINC 664 standard, ARINC 429 standard, ARINC 825 standard, or the RS-422 standard.

What is claimed is:

1. A system for read-access of a regulated system, comprising:
    a specialized data store of the regulated system, the specialized data store able to receive at least a portion of a set of procedures that defines a respective set of systematic data and an executable operation;
    at least one memory including at least one set of data relating to the set of procedures; and
    a flexible reader authorized for read-access to the specialized data store and the at least one memory, the flexible reader able to, in response to receiving a request from the specialized data store to retrieve the at least one set of data, retrieve the at least one set of data from the at least one memory.

2. The system of claim 1, further comprising a receiving component communicatively coupled to the regulated system, and able to:
    request a real-time execution of the executable operation on the regulated system based on the set of procedures; and
    receive a real-time execution output of the regulated system.

3. The system of claim 2, wherein the flexible reader is further able to provide the real-time execution output from the regulated system and to the receiving component.

4. The system of claim 1 further including a system for write-access, comprising:
    an authorized writer communicatively connected with the specialized data store and authorized for write access to the specialized data store by way of generating a runtime instruction communication delivered from the authorized writer to the specialized data store, the runtime instruction communication defining authorized data to write to the specialized data store; and
    a flexible writer that is not authorized for write access to the specialized data store, and adapted to receive the set of procedures, communicatively connected with the authorized writer, and able to:
    communicate instruction to the authorized writer to generate a runtime instruction communication; and
    replace the runtime instruction communication, during the delivery from the authorized writer to the specialized data store, with a respective subset of procedures such that the respective subset of procedures is committed to the specialized data store.

5. The system of claim 4, wherein the flexible writer is able to replace at least a portion of a loadable configuration file loaded on the regulated system.

6. The system of claim 4, wherein the respective subset of procedures includes a regulated system parameter, and the flexible writer is able to overwrite the regulated system parameter by way of replacing the runtime instruction communication.

7. The system of claim 1 wherein the regulated system is operably coupled to a test system and the set of procedures is a set of test procedures, each of the set of test procedures defining a respective set of test data and an executable test operation.

8. The system of claim 7, wherein the respective set of test data includes flight test data for the regulated system.

9. The system of claim 1 wherein the regulated system is regulated by at least one of an ARINC 664 standard, an ARINC 429 standard, an ARINC 825 standard, or a RS-422 standard.

10. The system of claim 1, further comprising an interface configured to enable a user to select one or more procedures of a set of procedures, and wherein the at least a subset of the selected set of procedures is received by the specialized data store.

11. The system of claim 1, wherein the regulated system is an avionics system.

12. A system for read-access of a regulated system, comprising:
- a specialized data store of the regulated system able to receive at least a portion of a loadable configuration file that includes an input parameter including at least a portion of a set of procedures;
- at least one memory including at least one set of data relating to at least a portion of the set of procedures; and
- a flexible reader authorized for read-access to the specialized data store and the at least one memory, the flexible reader able to, in response to receiving a request from the specialized data store to retrieve the at least one set of data, retrieve the at least one set of data from the at least one memory.

13. The system of claim 12, wherein the input parameter is received within an auxiliary system exterior the regulated system.

14. The system of claim 13, wherein the auxiliary system includes a user interface that receives an external input including at least the input parameter.

15. The system of claim 13, wherein the auxiliary system is a test system.

16. The system of claim 15, the set of procedures is a set of test procedures, each of the set of test procedures defining a respective set of test data and an executable test operation.

17. The system of claim 13, wherein the input parameter is provided to the regulated system during runtime of the regulated system.

18. A system for read-access of a regulated system, comprising:
- a specialized data store of the regulated system able to receive a at least a portion of a loadable configuration file that includes a set of procedures, each of the set of procedures defining a respective set of systematic data and an executable operation;
- at least one memory including at least one set of data relating to the set of procedures; and
- a flexible reader authorized for read-access to the specialized data store and the at least one memory, the flexible reader able to, in response to receiving a request from the specialized data store to retrieve the at least one set of data, retrieve the at least one set of data from the at least one memory.

19. The system of claim 18, wherein at least a portion of the loadable configuration file is received within an auxiliary system exterior the regulated system.

20. The system of claim 16, wherein the auxiliary system includes a user interface that receives an external input that goes into the loadable configuration file.

* * * * *